United States Patent [19]

Kaneko et al.

[11] Patent Number: 5,471,449
[45] Date of Patent: Nov. 28, 1995

[54] APPARATUS FOR RECORDING DEFECTIVE-POSITION INDICATING SIGNAL ON DISK MEDIUM

[75] Inventors: Shinji Kaneko; Kan Ebisawa, both of Kanagawa, Japan

[73] Assignee: Sony Corporation, Tokyo, Japan

[21] Appl. No.: 201,258

[22] Filed: Feb. 24, 1994

[30] Foreign Application Priority Data

Feb. 26, 1993 [JP] Japan ................................ 5-038953

[51] Int. Cl.$^6$ ........................................................ G11B 7/00
[52] U.S. Cl. ......................... 369/58; 369/54; 369/116
[58] Field of Search .................................. 369/58, 54, 116, 369/47, 48, 50, 44.32, 44.33

[56] References Cited

U.S. PATENT DOCUMENTS

| | | | |
|---|---|---|---|
| 4,835,758 | 5/1989 | Fujishima | 369/58 |
| 4,879,703 | 11/1989 | Kaku et al. | 369/13 |
| 4,980,878 | 12/1990 | Szerlip | 369/58 |
| 5,184,343 | 2/1993 | Johann et al. | 369/116 |

FOREIGN PATENT DOCUMENTS

0102607A1  3/1984  European Pat. Off. .
0464871A2  1/1992  European Pat. Off. .
61-145743  7/1986  Japan .

Primary Examiner—Georgia Y. Epps
Assistant Examiner—P. W. Huber
Attorney, Agent, or Firm—Limbach & Limbach

[57] ABSTRACT

An apparatus for recording a defective-position indicating signal on a nonrecorded WO disk, comprising a laser beam source such as a laser diode for generating a laser beam to be irradiated onto the disk; an optical detector supplied with the laser beam reflected from the disk; an FM demodulator for demodulating the FM output signal of the optical detector; a defect detector for detecting a defect on the disk by comparing the output signal level of the FM demodulator with a reference value; and a laser power controller normally functioning to modulate the power of the laser beam by a fixed-frequency signal, or functioning, in response to detection of a defect, to maintain the laser beam power at an adequate recordable level for a first predetermined time after such detection. A detection controller is also included for interrupting the operation of the defect detector under control for a second predetermined time after the detection of the defect. The first predetermined time is approximately equal to one period of an FM carrier, and any dropout inclusive of micro DO can be completely detected.

7 Claims, 6 Drawing Sheets

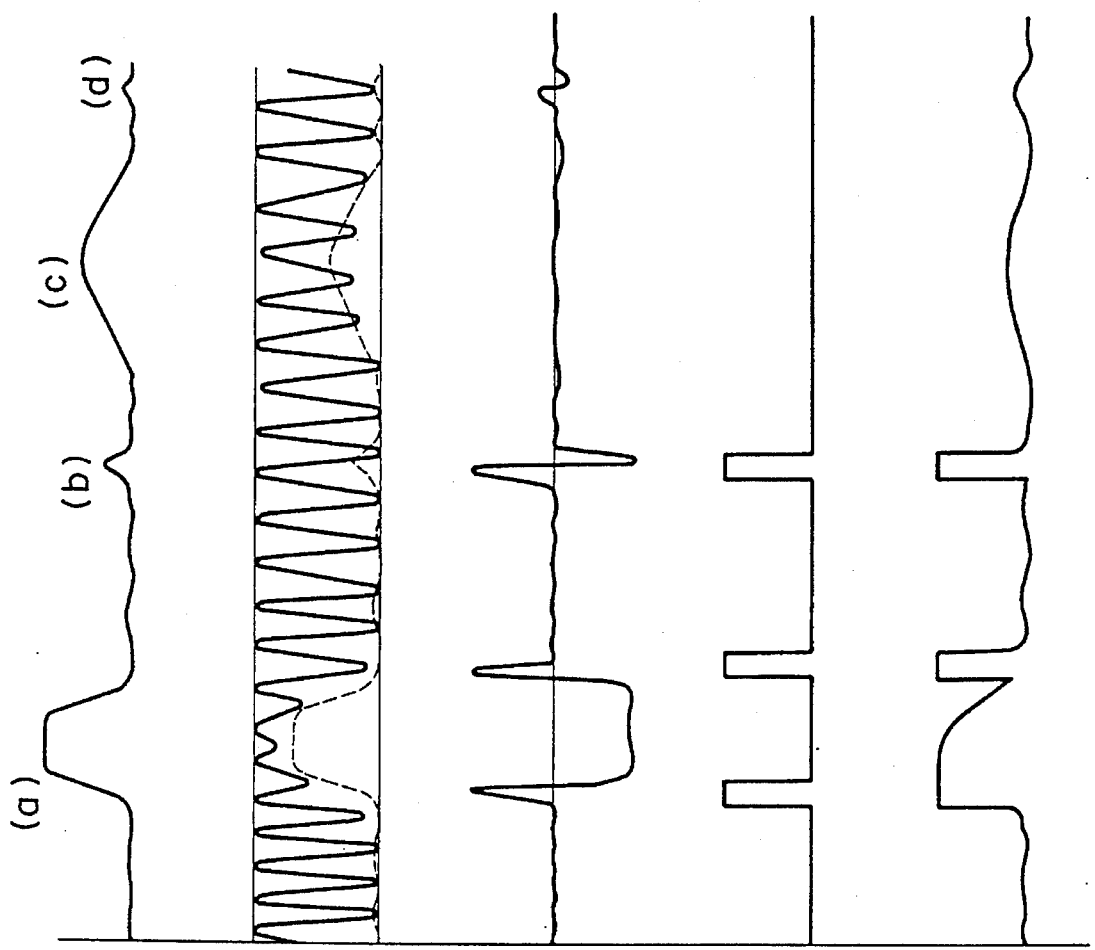

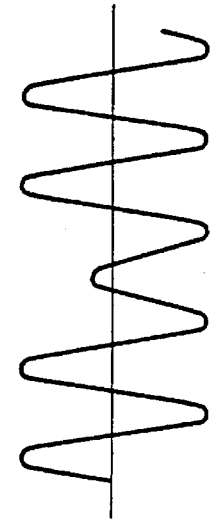
FIG. 6(c) MICRO DROPOUT
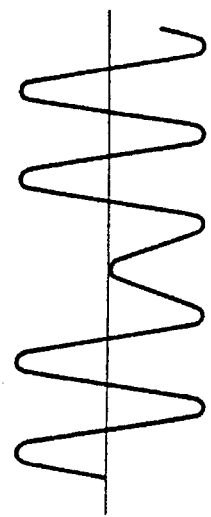
FIG. 6(b) HALF-WAVE DROPOUT
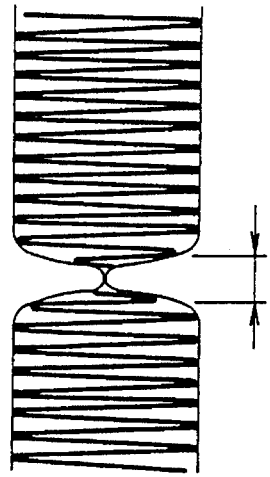
FIG. 6(a) SEVERAL μSEC

APPARATUS FOR RECORDING DEFECTIVE-POSITION INDICATING SIGNAL ON DISK MEDIUM

BACKGROUND OF THE INVENTION

1. Field of the Invention

The present invention relates to an apparatus for recording a defective-position indicating signal at a defective position on a recording disk medium.

2. Description of the Prior Art

FIG. 5 shows the constitution of an optical pickup for a WO (write once) disk on which a signal is recordable only once.

In this diagram, reference numeral 1 denotes a laser diode (semiconductor laser) serving as a laser beam source, and reference numeral 2 denotes a laser driver for driving the laser diode 1. The laser beam outputted from the laser diode 1 is irradiated to a WO disk 7 through a coupling lens 3, a beam splitter 4, a ¼ wavelength plate 5 and an objective lens 6.

In a recording mode, a record signal is modulated in a modulator 8 and is supplied to the laser driver 2, so that the power of the laser beam outputted from the laser diode 1 is modulated by the record signal (modulating signal), and then such record signal is recorded on the disk 7. Meanwhile in a playback mode, the power of the laser beam outputted from the laser diode 1 is kept at a fixed value.

The laser beam reflected by the beam splitter 4 is transmitted through a condenser lens 9 and is incident upon a photo diode 10 which serves as an optical detector. The detection output of the photo diode 10 is supplied to an APC (automatic power controller) 11, which then controls the laser driver 2 so that the power of the laser beam outputted from the laser diode 1 is controlled to an optimal value in each of the recording and playback modes.

The laser light reflected from the disk 7 is incident upon a dividing photo diode 14 via the ¼ wavelength plate 5, the beam splitter 4, a condenser lens 12 and a knife edge prism 13. The divided output signals of the photo diode 14 are mutually subtracted in an operational amplifier 15 to be thereby formed into a focus error signal. This signal is then supplied to a focusing driver 16, so that the current flowing in a focus coil 17 is controlled with a focus servo action.

Meanwhile the laser beam reflected from the knife edge prism 13 is incident upon the dividing photo diode 18. The divided output signals of the photo diode 18 are mutually subtracted in an operational amplifier 19 to be thereby formed into a tracking error signal. This signal is then supplied to a tracking driver 20, so that the current flowing in a tracking coil 21 is controlled with a tracking servo action.

In a playback mode, the divided output signals of the photo diode 14 are mutually added in an operational amplifier 22 to become a playback signal, which is then supplied to a demodulator 23 to be thereby demodulated.

In a disk playback apparatus for reproducing an FM video signal recorded on a video disk, there occurs micro dropout (hereinafter referred to as "micro DO") peculiar to the video disk. Such micro DO is an individual dropout smaller than half the carrier wave and caused by a defect of the disk or dust deposited thereon. It is difficult to exactly distinguish between the video signal and the noise derived from such micro DO, and complete detection of the micro DO is not attainable. Consequently, there has been existent a problem relative to deterioration of the reproduced picture quality resulting from the micro DO.

FIG. 6 illustrates some kinds of dropouts, in which: (a) is a dropout of several μsec; (b) is a half-wave dropout of the carrier; and (c) is a micro DO. FIG. 7 graphically shows the noises derived from such dropouts in a video signal.

SUMMARY OF THE INVENTION

It is an object of the present invention to provide an apparatus capable of achieving complete detection of dropouts inclusive of micro DO, so as to prevent deterioration of the reproduced picture quality.

According to one aspect of the present invention, there is provided an apparatus for recording a defective-position indicating signal on a recording disk medium. The apparatus comprises a laser beam source for generating a laser beam to be irradiated onto the disk medium; an optical detector supplied with the laser beam reflected from the disk medium; an FM demodulator for demodulating the FM output signal of the optical detector; a defect detection means for detecting a defect on the disk medium by comparing the output signal level of the FM demodulator with a reference value; and a laser power control means normally functioning to modulate the power of the laser beam by a fixed-frequency signal, or functioning, in response to detection of a defect by the defect detection means, to maintain the power of the laser beam at an adequate recordable level for a predetermined time after the detection of the defect.

Therefore, when any portion of the disk predicted to have a dropout inclusive of micro DO has been detected as a defect, a defective-position indicating signal is recorded on the disk merely for a predetermined time (e.g., one period of the FM carrier), so that no dropouts smaller than a half-wave defect are generated to consequently realize complete dropout detection. Consequently it becomes possible to accomplish substantial elimination of the noise that may otherwise be caused by micro DO, hence preventing deterioration of the reproduced picture quality.

And the operation of the defect detection means is interrupted for another predetermined time after detection of any defect, thereby preventing any erroneous function including detection of a defect during the recording of a defective-position indicating signal.

Furthermore, the laser beam source consists of a laser diode, and the current flowing in the laser diode is directly increased for a predetermined time after detection of the defect by the defect detection means. Accordingly, in comparison with the known conventional apparatus where the current is increased by controlling the automatic power controller or the like, the current can be increased more sharply to consequently realize a smooth shift into a recording operation.

The above and other features and advantages of the present invention will become apparent from the following description which will be given with reference to the illustrative accompanying drawings.

BRIEF DESCRIPTION OF THE DRAWINGS

FIGS. 4(a–e) is a timing chart of signals for explaining the operation of the embodiment shown in FIG. 1;

FIGS. 6(a) to 6(c) are schematic diagrams for explaining some kinds of dropouts.

DESCRIPTION OF THE PREFERRED EMBODIMENT

Figure 1:
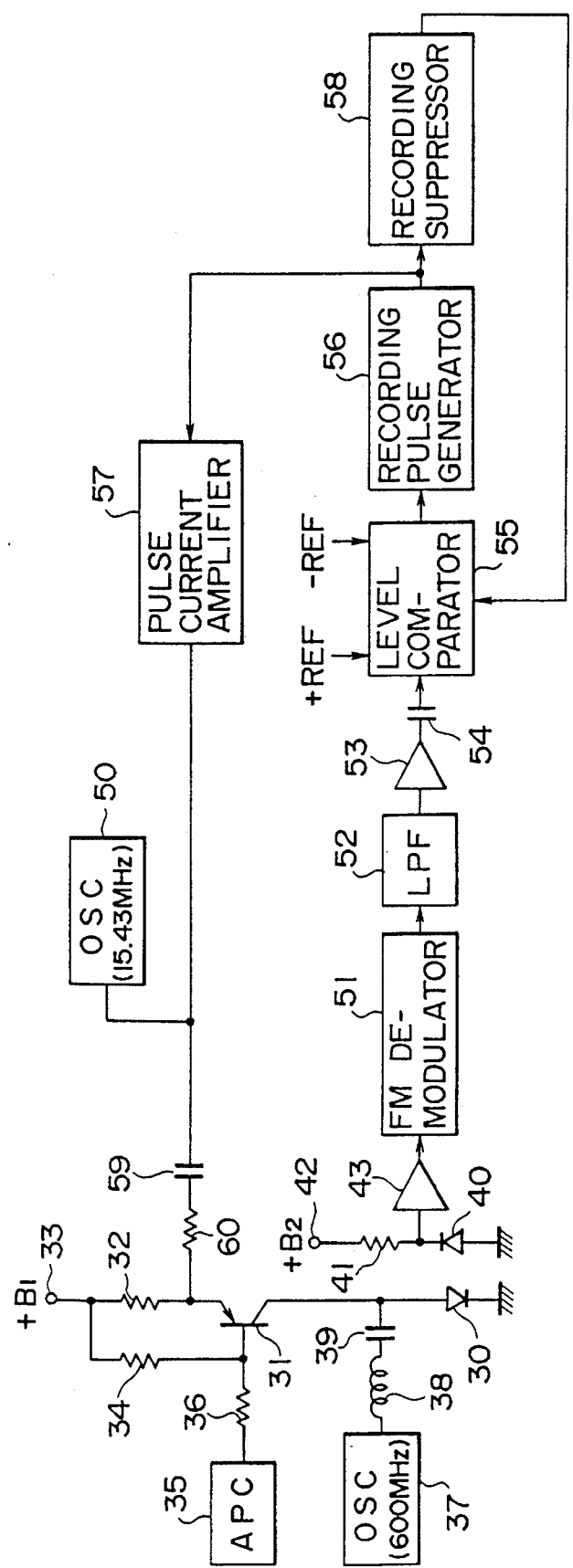
FIG. 1 is a connection diagram of a preferred embodiment representing the apparatus of the present invention for recording a defective-position indicating signal on a recording disk medium.

Hereinafter a preferred embodiment of the present invention will be described in detail with reference to FIG. 1. A recording disk medium employed in this embodiment is a WO disk.

In this diagram, reference numeral 30 denotes a laser diode. The cathode of this diode 30 is grounded, and the anode thereof is connected to a power terminal 33 via the collector-emitter of a PNP transistor 31 and a resistor 32. The power terminal 33 is connected via a resistor 34 to the base of the transistor 31, to which a bias voltage is applied. And a control signal outputted from an APC (automatic power controller) 35 is also supplied to the base of the transistor 31.

Denoted by 37 is a radio-frequency oscillator. A radio-frequency signal of, e.g., 600 MHz outputted from the oscillator 37 is supplied via a coil 38 and a capacitor 39 to the junction of the transistor 31 and the laser diode 30, thereby constituting a radio-frequency superimposing laser diode driver of a known circuit configuration. Due to superimposition of a ratio-frequency signal, the signal-to-noise radio can be improved to consequently reduce the noise.

Reference numeral 40 denotes a photo diode. The anode of this diode 40 is grounded, and the cathode thereof is connected via a resistor 41 to a power terminal 42. A signal obtained from the junction of the photo diode 40 and the resistor 41 is supplied to an amplifier 43.

Figure 5:
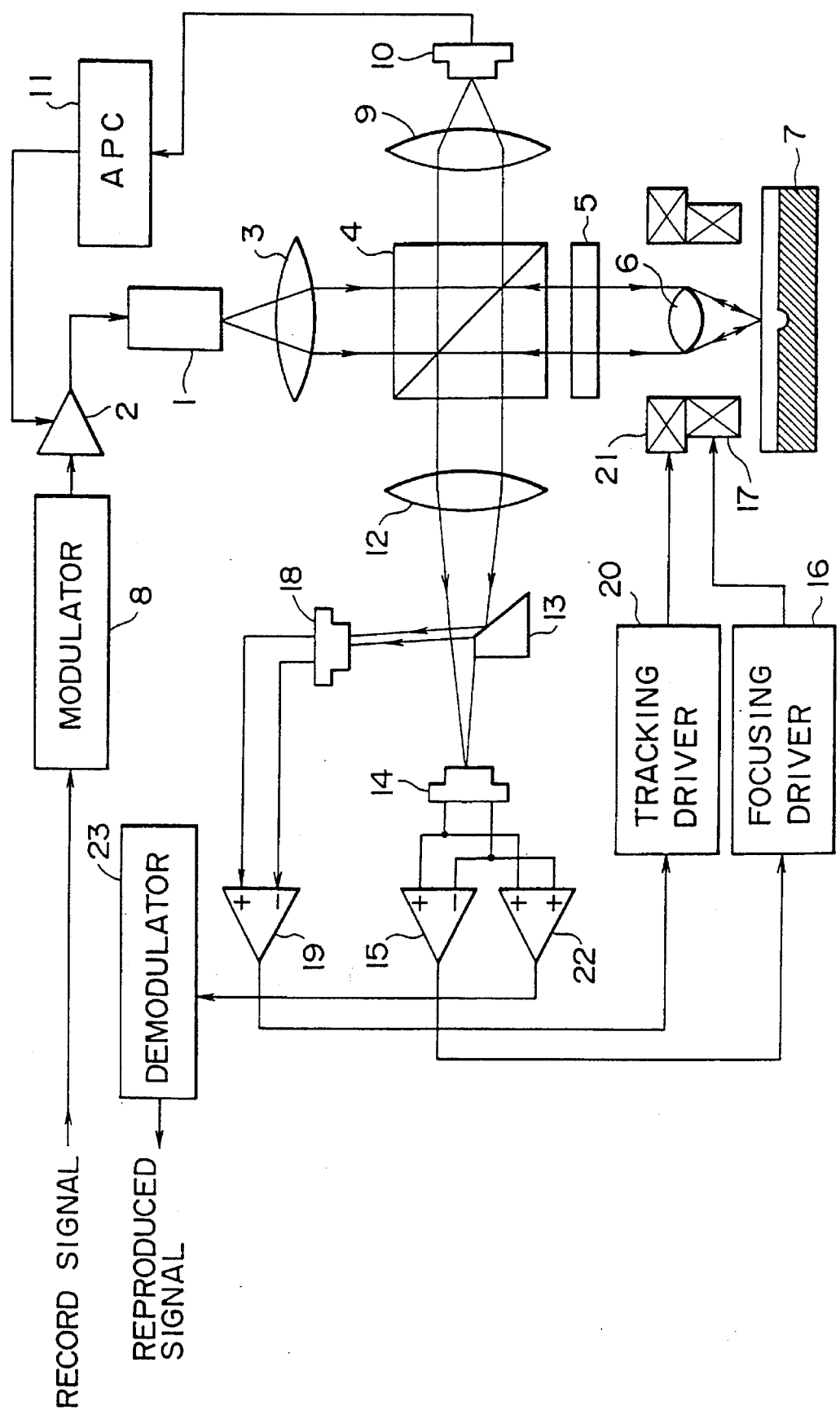
FIG. 5 shows the constitution of an optical pickup for a WO disk.
Figure 7:
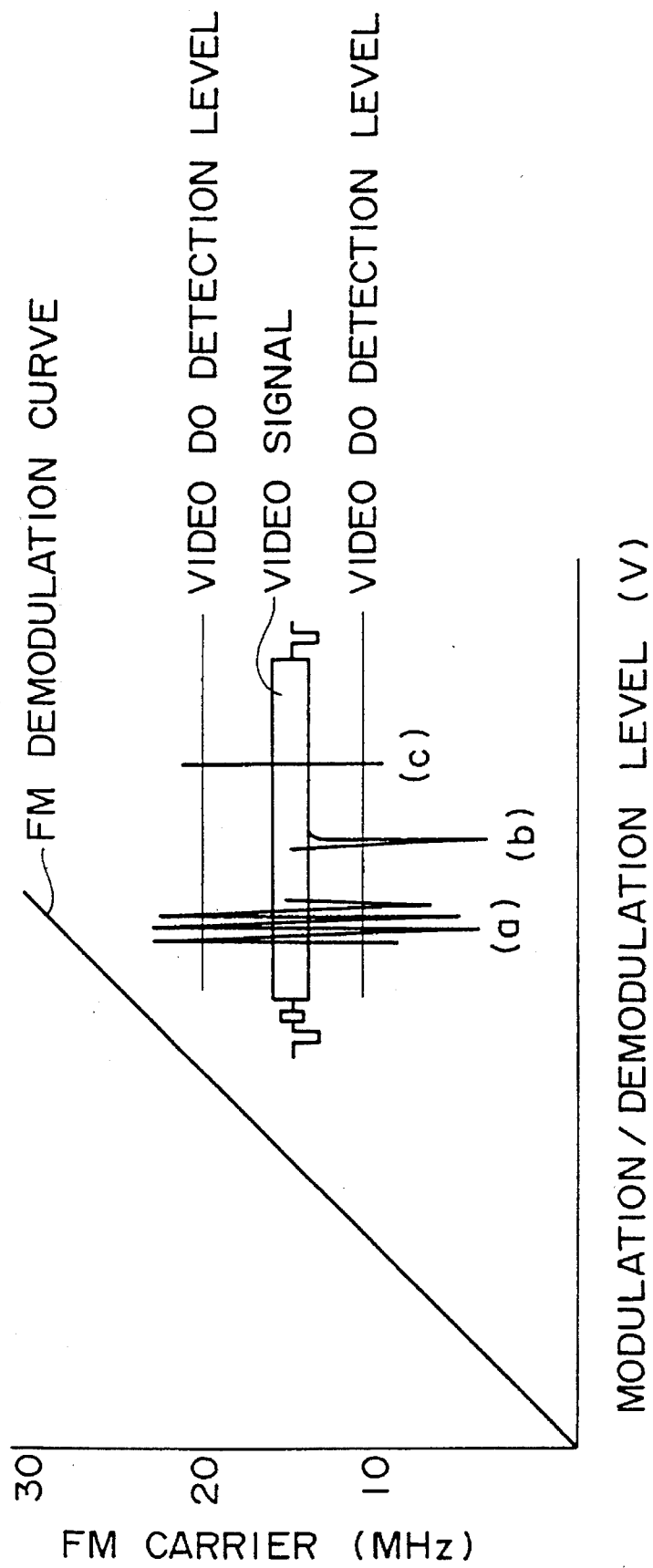
FIG. 7 graphically shows noises derived from dropouts of a video signal.

In the above constitution, the laser diode 30 corresponds to the laser diode 1 shown in the example of FIG. 5; the transistor 31, the oscillator 37 and so forth correspond to the laser driver 2 in FIG. 5; the APC 35 corresponds to the aforesaid APC 11 in FIG. 5; the photo diode 40 to the aforesaid photo diode 14 in FIG. 5; and the amplifier 43 to the operational amplifier 22 in FIG. 5, respectively. Although a lens system and a servo system are omitted in the illustration of FIG. 1, such systems are constituted similarly to those employed in the aforementioned example of FIG. 5.

Denoted by 50 is an oscillator which generates a fixed-frequency signal of, e.g., 15.43 MHz. The output signal of the oscillator 50 is supplied via a capacitor 59 and a resistor 60 to the junction of the transistor 31 and the resistor 32. The power of a laser beam emitted from the laser diode 30 is controlled normally by the APC 35 to be thereby maintained at a value optimally recordable, and the power thus controlled is modulated by the fixed-frequency signal. The modulation level is so set that the output signal of the amplifier 43 is kept approximately at −12 dB of the normal reproduction level.

The laser beam, whose power has thus been modulated by the fixed-frequency output signal of the laser diode 30, is irradiated onto an unshown nonrecorded WO disk (cf. WO disk 7 in FIG. 5). The laser beam reflected from the WO disk is incident upon the photo diode 40, and the modulated signal from the amplifier 43 is supplied to an FM demodulator 51 to be thereby demodulated. The output signal of the FM demodulator 51 is band-limited through a low-pass filter 52 and, after being amplified in an amplifier 53, the DC component is blocked by a capacitor 54 and then the signal is supplied to a level comparator 55.

The frequency band of the low-pass filter 52 is selectively set to, e.g., 1.7 times the aforementioned fixed frequency (15.43 MHz) for the reason that essentially it is equivalent to nonmodulation recording, and the requirement is met merely by attenuating the double-frequency waves of such fixed-frequency signal through the low-pass filter 52. Since demodulation of the nonmodulated signal is performed in the FM demodulator 51, the zero level can be reproduced sufficiently by blocking the DC component alone by the capacitor 54.

The demodulated signal separated from the DC zero is entirely a noise component, and it is compared with positive and negative reference values +REP and −REP in the level comparator 55. And a defect detection signal is outputted when the level of the demodulated signal exceeds the reference values +REP and −REP. The defect detection signal obtained from the level comparator 55 is supplied as a trigger signal to a recording pulse generator 56 consisting of, e.g., a monostable multivibrator, and a recording pulse is outputted from the recording pulse generator 56. When the frequency-modulated video signal is recorded on the WO disk, the duration of such recording pulse is set approximately to one period of the FM carrier, e.g., 100 msec or so.

The recording pulse outputted from the recording pulse generator 56 is supplied to a pulse current amplifier 57. For the duration of such recording pulse, a great current is caused to flow from the pulse current amplifier 57 via a capacitor 59, a resistor 60 and the transistor 31 to the laser diode 30, so that the laser beam power is rendered sufficiently great to be recordable, and thus the signal is recorded on the nonrecorded WO disk. More specifically, recording is performed at a position of the WO disk where occurrence of a dropout is presumed, so that the reflectivity thereat is saturated, i.e., a defective-position indicating signal is recorded. It is possible to increase the current flow in the laser diode 30 by controlling the APC 35 as well, but the operation speed becomes low in such a case. Therefore, in this embodiment, a great current is supplied directly from the pulse current amplifier 57.

The recording pulse outputted from the recording pulse generator 56 is supplied as a trigger signal to a recording suppressor 58, which consists of, e.g., a monostable multivibrator and produces a recording suppression pulse. The duration of this recording suppression pulse is selectively set to, e.g., 1 μsec or so. The recording suppression pulse thus outputted from the recording suppressor 58 is supplied to the level comparator 55, whose operation is thereby interrupted for the duration of the recording suppression pulse. As a result, the level comparator 55 is placed in a non-operating state during at least the time when the signal is recorded on the WO disk, hence preventing an erroneous operation.

Figure 2:
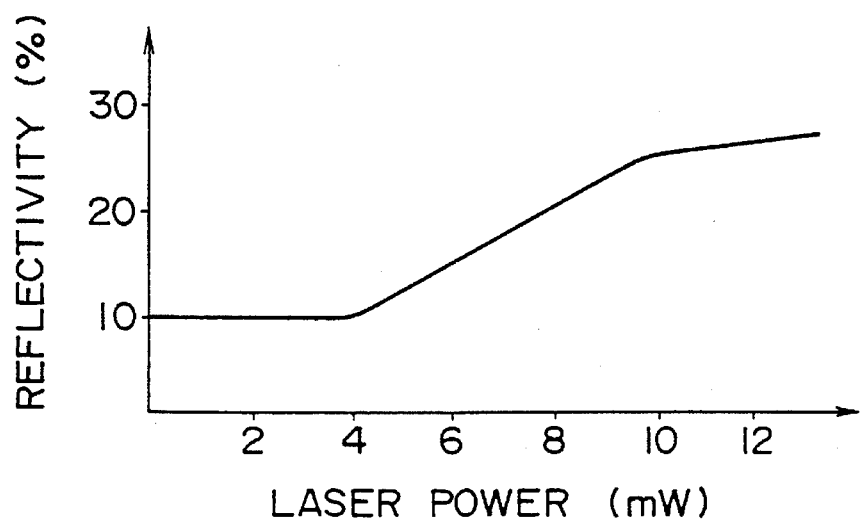
FIG. 2 graphically shows the reflectivity characteristic of a write once (WO) disc to a recording laser power.
Figure 3A:
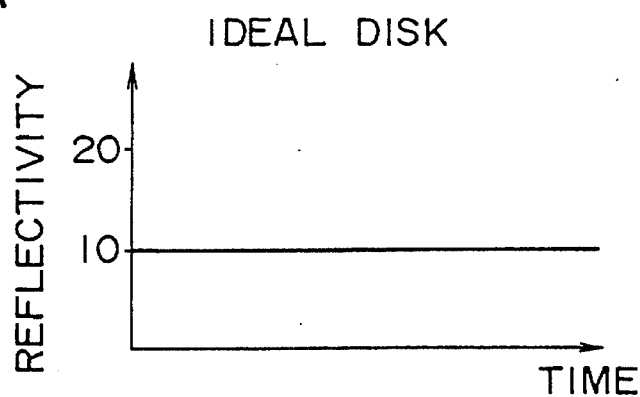
FIGS. 3A and 3B graphically show the reflectivity characteristics of nonrecorded WO disks.
Figure 3B:
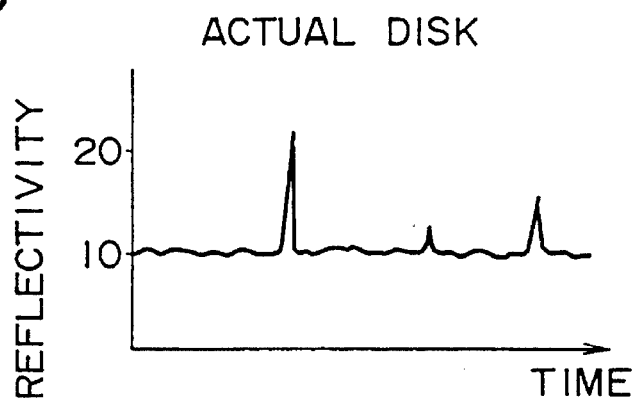

FIG. 2 graphically shows the reflectivity characteristic of a WO disk to the recording laser power. Normally the reflectivity of a nonrecorded disk ranges from 9 to 14%, while that of a recorded disk ranges from 15 to 20%, and any higher reflectivity is not existent. When a nonrecorded WO disk is played, the reflectivity is constant as shown in FIG. 3A in case the disk is an ideal one. Practically, however, the reflectivity of an actual disk varies as shown in FIG. 3B.

In an exemplary view of FIG. 4A with the enlarged time base, there are observed a defect (a) where the time is long and the reflectivity variation is also great with respect to the to the carrier to be recorded, a defect (c) where the time is long but the reflectivity variation is small, a defect (b) where the time is short but the reflectivity variation is great, and another defect (d) where the time is short and the reflectivity variation is also small. In the defects (c) and (d), none of overmodulation is caused in recording and/or reproducing an FM signal, and no problem arises particularly in the defect (c). Meanwhile in the defect (b), AM noise is rather small, but overmodulation is caused due to half-wave dropout or micro DO in recording and/or reproducing an FM signal, so that great noise is generated when the signal is demodulated.

In a nonrecorded WO disk having the reflectivity variations of FIG. 4A for example, the reproduced RF signal obtained from the amplifier 43 in this embodiment is such as shown in FIG. 4B, and the demodulated signal obtained from the FM demodulator 51 is such as shown in FIG. 4C. Recording pulses of FIG. 4D are outputted from the recording pulse generator 56, so that a defective-position indicating signal is recorded at each of the corresponding positions on the nonrecorded WO disk to thereby provide the WO disk with the reflectivity of FIG. 4E.

When an FM signal for example is recorded on and reproduced from a nonrecorded WO disk having the reflectivity of FIG. 4E, it is presumed with facility that a dropout occurs in the disk portion where the reflectivity is saturated due to the defective-position indicating signal recorded in response to a recording pulse as described.

Since in this case the duration of the recording pulse is set approximately to one period of the FM carrier, there never occurs generation of any micro dropout smaller than a half wave. Accordingly, it becomes possible in the playback circuit to completely detect any greater dropout and to execute an adequate process of compensating for the detected dropout. And any twinkling noise or the like derived from micro DO can be eliminated substantially completely to thereby prevent deterioration of the reproduced picture quality. Thus, by recording a defective-position indicating signal on a WO disk as in this embodiment, compensation for dropout is rendered nearly perfect to consequently raise the efficiency in the inspection of manufactured WO disks.

In the embodiment described above, a recording operation is performed after detection of a dropout by the level comparator 55, so that a defective-position indicating signal is recorded at a position slightly posterior to the actual defective position. However, there arises no problem if, in the playback circuit, an adjustment is executed to attain a timing coincidence with the dropout detection signal by taking into consideration the delay of the video signal in the main line.

In addition to the above embodiment where the recording disk medium is a WO disk, it is a matter of course that the present invention is applicable to any other disk medium as well as a magneto-optical (MO) disk.

Thus, according to the present invention, when any disk portion predicted to have a dropout inclusive of micro DO has been detected as a defect, a defective-position indicating signal is recorded on the disk for a predetermined time (e.g., one period of the carrier), so that any dropout smaller than a half of the carrier wave is never generated to eventually realize complete dropout detection. Consequently it becomes possible to accomplish substantial elimination of the noise that may otherwise be caused by micro DO, hence preventing deterioration of the reproduced picture quality.

And the operation of the defect detection means is interrupted for another predetermined time after detection of any defect, thereby preventing any erroneous function including detection of a defect during the recording of a defective-position indicating signal.

What is claimed is:

1. An apparatus for recording a defective-position indicating signal on a recording disk medium, comprising:

a laser beam source for generating a laser beam for irradiating said disk medium;

an optical detector for receiving a reflection of the laser beam from said disk medium and generating a reflection signal having a value corresponding to a reflectivity of said disk medium;

defect detection means for detecting a defect on said disk medium by comparing the reflection signal with a predetermined reference value; and laser power control means for modulating the power of the laser beam by a fixed-frequency signal at a first power level normally and, responsive to detection of a defect by said defect detection means, shifting the power of the laser beam to a second power level greater than said first power level for a first predetermined time after said detection, said second power level being adequate to record on said disk medium.

2. The apparatus according to claim 1 further comprising a detection control means for interrupting the operation of said defect detection means for a second predetermined time after detection of any defect by said defect detection means.

3. The apparatus according to claim 1, wherein said laser beam source comprises a laser diode, and said laser power control means directly increases, for said first predetermined time, the current flowing in said laser diode.

4. The apparatus according to claim 1, wherein said first predetermined time is approximately equal to one period of an FM carrier.

5. An apparatus as set forth in claim 1 wherein said laser beam source comprises an oscillator for modulating said beam at a predetermined frequency, and said defect detection means comprises a demodulator for demodulating said reflection signal.

6. An apparatus as set forth in claim 5 wherein said defect detection means further comprises;

a capacitor for removing any DC component of said demodulated reflection signal to produce a DC free demodulated reflection signal, and a level comparator for comparing the amplitude of said DC free demodulated reflection signal with the amplitude of said reference signal and generating a defect detected signal if the amplitude of said DC free demodulated reflection signal exceeds the amplitude of said reference signal.

7. An apparatus as set forth in claim 6 wherein said laser power control means comprises;

a recording pulse generator for generating a recording pulse of a predetermined duration responsive to said defect detected signal, and a pulse current amplifier, responsive to said recording pulse, for increasing the power of said laser from said first level to said second level during said recording pulse.

* * * * *